(No Model.)
J. B. MORGAN.
STEAM JOINT FOR ROTARY PIPE OR HOLLOW SHAFTING.
No. 459,692. Patented Sept. 15, 1891.
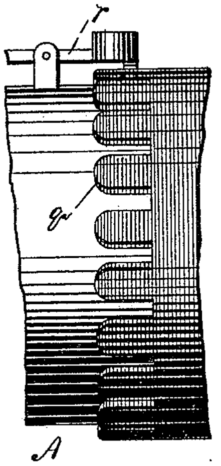
Fig-2-
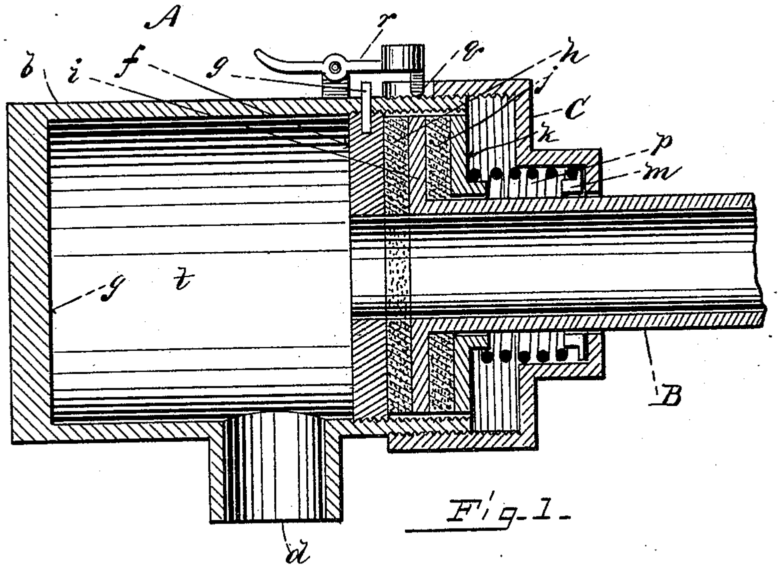
Fig-1-
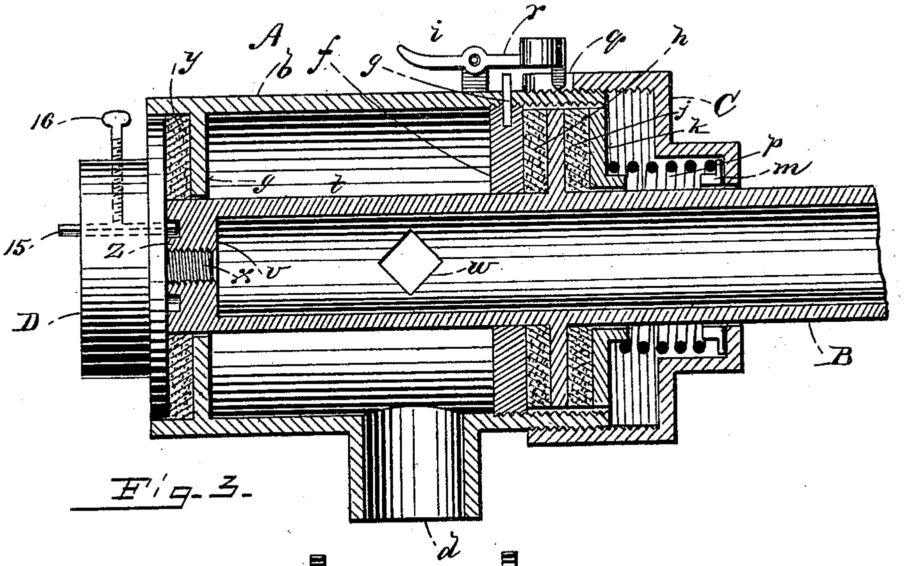
Fig-3-
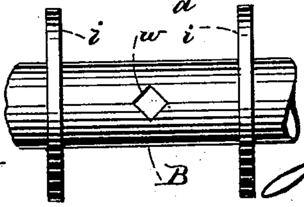
Fig-4
Witnesses:
Gardner W. Spence
A. Durfee
Inventor:
John B. Morgan,
per C. A. Shaw & Co.,
Atty's.
THE NORRIS PETERS CO., PHOTO-LITHO., WASHINGTON, D. C.

UNITED STATES PATENT OFFICE.

JOHN B. MORGAN, OF MIDDLEBOROUGH, MASSACHUSETTS, ASSIGNOR OF THREE-FOURTHS TO EDITH F. MORGAN, OF SAME PLACE.

STEAM-JOINT FOR ROTARY PIPE OR HOLLOW SHAFTING.

SPECIFICATION forming part of Letters Patent No. 459,692, dated September 15, 1891.

Application filed February 16, 1891. Serial No. 381,625. (No model.)

*To all whom it may concern:*

Be it known that I, JOHN B. MORGAN, of Middleborough, in the county of Plymouth, State of Massachusetts, have invented certain new and useful Improvements in Steam-Joints for Rotary Pipe or Hollow Shafting, of which the following is a description sufficiently full, clear, and exact to enable any person skilled in the art or science to which said invention appertains to make and use the same, reference being had to the accompanying drawings, forming part of this specification, in which—

Figure 1 is a vertical longitudinal section of my improved joint; Fig. 2, an elevation showing the head-locking mechanism; Fig. 3, a vertical longitudinal section, and Fig. 4 an elevation showing modifications in the manner of mounting the shaft.

Like letters and numerals of reference indicate corresponding parts in the different figures of the drawings.

My invention relates especially to joints for conveying steam to rotary or oscillating machinery; and it consists in certain novel features hereinafter fully set forth and claimed, the object being to produce a simpler, cheaper, and more effective device of this character than is now in ordinary use.

The nature and operation of the improvement will be readily understood by all conversant with such matters from the following explanation.

In the drawings, A represents the body of the joint, which comprises a cylinder *b*, provided with a supply-port *d* and having one end closed by a solid head *g*. The opposite end of the cylinder is interiorly and exteriorly screw-threaded, as shown in Fig. 1. An exteriorly-threaded nut *f* is turned into the cylinder and secured by a pin *g*. A packing-ring *h* is disposed against the outer face of said nut.

The rotary pipe or shaft B is provided on its end with an annular flange *i*, fitted to enter the cylinder-mouth and engage the packing *h*. A packing-ring *j* is disposed around the pipe outside said flange. A flanged or hubbed follower-ring *k* encircles the pipe outside the packing. A screw-cap C, through which pipe B passes, is turned onto the cylinder. A washer *m* is disposed within the cap, and a push-spring *p*, coiled around the pipe, is interposed between said washer and the follower *k*. The edge of the cap C is toothed or spurred at *q*, and a weighted locking-pawl *r*, pivoted on the cylinder, engages said teeth and prevents the cap from working off from the cylinder. Steam entering the port *d* passes from the cylinder *t* through the pipe B, the nut, packing, and spring-pushed follower forming a steam-tight joint for said pipe, while permitting it freely to rotate.

In Fig. 3 the pipe is extended through the cylinder-head *g*. The inner end of the pipe is solid at *v*, and a port *w* in the pipe-wall admits steam from the chamber *t*. The solid end *v* of the pipe is tapped centrally to receive the screw *x* of a head D, packing *y* being interposed between said screw-head and the cylinder-head *g*. A series of notches or sockets *z* are formed in the pipe end *v*. A sliding pin 15, passing through the head D, may enter said sockets and lock said head. Said pin is secured by a set-screw 16.

In Fig. 4 the pipe is shown provided with two flanges *i*, and is designed to convey steam in both directions from the cylinder. When this form is used, the cylinder-head *g*, nuts *f*, and packing-ring *h* may be dispensed with, a screw-cap C and spring-pushed follower being employed at both ends of the cylinder.

Having thus explained my invention, what I claim is—

1. In a joint for rotary steam shaft or pipe, a cylinder provided with a supply-port, in combination with a pipe having an annular flange, a screw-cap on said cylinder, packing, and a spring-pushed follower bearing against said flange, substantially as described.

2. In a device of the character described, a cylinder closed at one end and provided with a supply-port, a nut secured in the opposite cylinder end, a rotary pipe having an annular flange for entering said cylinder, packing for said flange, a screw-cap for closing said cylinder, and a spring-pushed follower engaging said packing, substantially as described.

3. In a device of the character described, the cylinder *b*, having the port *d* and head *g*, in combination with the flanged pipe fitted to rotate therein, the nut, packing, and spring-pushed follower, and the screw-cap C, all being arranged to operate substantially as described.

4. The cylinder, serrated screw-cap, and locking mechanism, in combination with the flanged rotary pipe and mechanism for packing it in said cylinder, substantially as described.

5. The steam-cylinder and serrated cap closing an end thereof, in combination with locking mechanism for said cap, the flanged pipe B, fitted to rotate in said cylinder, a nut secured in said cylinder, packing for said pipe, and a spring-pushed follower disposed between said packing and cap, substantially as described.

6. The cylinder, in combination with the flanged pipe B, fitted to rotate therein and provided with port *w*, opening into the cylinder and the tapped and socketed head *v*, the screw-head D and mechanism for locking it to the pipe-head, the cap C on the cylinder and locking mechanism therefor, packing for said pipe, and the spring-pushed follower interposed between said cap and packing, substantially as described.

7. The combination of the cylinder A with the pipe B, having the flange *i*, the screw-cap C and locking mechanism, the nut *f*, packing-rings *h j*, and the spring-pushed follower *k*, all being arranged to operate substantially as described.

JOHN B. MORGAN.

Witnesses:
JOHN SHAW,
GEORGE E. DOANE.